United States Patent
Weerakoon et al.

(10) Patent No.: US 8,582,491 B2
(45) Date of Patent: Nov. 12, 2013

(54) METHOD AND APPARATUS FOR ROUTING COMMUNICATIONS USING ACTIVE AND PASSIVE END-TO-END QUALITY-OF-SERVICE RESERVATIONS BASED ON NODE MOBILITY PROFILES

(75) Inventors: Ishan P. Weerakoon, Rockville, MD (US); Mei Ngan, Germantown, MD (US); Suresh K. Iyer, Germantown, MD (US); Giri Kuthethoor, Boyds, MD (US); Prakash M. Sesha, Boyds, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1377 days.

(21) Appl. No.: 12/248,914

(22) Filed: Oct. 10, 2008

(65) Prior Publication Data

US 2009/0274106 A1    Nov. 5, 2009

Related U.S. Application Data

(60) Provisional application No. 61/050,044, filed on May 2, 2008.

(51) Int. Cl.
*H04W 4/00* (2009.01)
*H04L 12/66* (2006.01)
*H04B 7/14* (2006.01)

(52) U.S. Cl.
USPC ............................. 370/315; 370/329; 370/352

(58) Field of Classification Search
USPC .......................... 370/329, 352, 315
See application file for complete search history.

(56) References Cited

U.S. PATENT DOCUMENTS

| | | | |
|---|---|---|---|
| 6,577,868 B1 | 6/2003 | Vialen et al. | |
| 6,708,034 B1 | 3/2004 | Sen et al. | |
| 7,123,598 B1 | 10/2006 | Chaskar | |
| 7,489,655 B2 * | 2/2009 | Chen | 370/329 |
| 7,536,466 B2 * | 5/2009 | Yanamoto et al. | 709/230 |
| 7,693,093 B2 * | 4/2010 | Riedel et al. | 370/260 |
| 2003/0016655 A1 | 1/2003 | Gwon | |
| 2003/0095504 A1 * | 5/2003 | Ogier | 370/235 |

(Continued)

FOREIGN PATENT DOCUMENTS

JP    2007306318 A    11/2007

OTHER PUBLICATIONS

Talukdar A.K., Badrinath B.R., and Acharya A., "MRSVP: A Reservation Protocol for an Integrated Services Packet Network with Mobile Hosts," Tech. Rep. DCS-TR-337, Department of Computer Science, Rutgers University, U.S.A., 1997.

(Continued)

*Primary Examiner* — Brandon Renner
*Assistant Examiner* — Faisal Choudhury
(74) *Attorney, Agent, or Firm* — Ronald E. Prass, Jr.; Prass LLP

(57) ABSTRACT

A method and apparatus for routing communications using end-to-end QoS reservations based on node mobility profiles is disclosed. The method may include setting up active quality of service reservations along a first path to a destination edge node, receiving a mobility profile from the destination edge node, setting up passive quality of service reservations based on the received mobility profile, switching communications from active quality of service reservations to passive quality of service reservations, and tearing down the active quality of service reservations based on the received mobility profile.

30 Claims, 8 Drawing Sheets

(56) References Cited

U.S. PATENT DOCUMENTS

| | | | |
|---|---|---|---|
| 2003/0112766 A1* | 6/2003 | Riedel et al. | 370/252 |
| 2003/0174688 A1* | 9/2003 | Ahmed et al. | 370/349 |
| 2004/0228304 A1 | 11/2004 | Riedel et al. | |
| 2004/0264409 A1 | 12/2004 | Lee et al. | |
| 2005/0105490 A1* | 5/2005 | Lee et al. | 370/331 |
| 2005/0169238 A1* | 8/2005 | Yang et al. | 370/351 |
| 2007/0047508 A1 | 3/2007 | Yamada et al. | |
| 2007/0097892 A1 | 5/2007 | Tsang | |
| 2007/0109966 A1* | 5/2007 | Lee et al. | 370/231 |
| 2007/0217363 A1 | 9/2007 | Ue et al. | |
| 2007/0217406 A1* | 9/2007 | Riedel et al. | 370/389 |
| 2008/0008137 A1* | 1/2008 | Robinson | 370/338 |
| 2008/0049620 A1* | 2/2008 | Riga et al. | 370/236 |
| 2008/0140842 A1* | 6/2008 | Kwang-Il et al. | 709/226 |
| 2009/0022161 A1* | 1/2009 | Hirano | 370/400 |
| 2009/0161640 A1* | 6/2009 | Shin et al. | 370/338 |

OTHER PUBLICATIONS

Awduche, D.O., and Agu, E., "Mobile Extensions to RSVP," Proceedings of Sixth International Conference on Computer Communications and Networks, pp. 132-136, 1997.

Chien-Chao Tseng, Gwo-Chuan Lee, Ren-Shiou Liu, Tsan-Pin Wang: HMRSVP: A Hierarchical Mobile RSVP Protocol. Wireless Networks 9(2): 95-102 (2003).

* cited by examiner

METHOD AND APPARATUS FOR ROUTING COMMUNICATIONS USING ACTIVE AND PASSIVE END-TO-END QUALITY-OF-SERVICE RESERVATIONS BASED ON NODE MOBILITY PROFILES

PRIORITY INFORMATION

This application claims priority from U.S. Provisional Patent Application Ser. No. 61/050,044, filed May 2, 2008, the contents of which are incorporated herein by reference.

BACKGROUND OF THE DISCLOSURE

1. Field of the Disclosure

The disclosure relates to packet based communication networks.

2. Introduction

In fixed Internet Protocol (IP) based networks, end-to-end guaranteed quality of service (QoS) may successfully be provided using a protocol such as the Resource Reservation Protocol (RSVP). RSVP sets up a path of soft reservations from the source to destination based on the desired QoS (i.e., bandwidth requirement). Although RSVP works well with fixed networks, it may not perform well in networks with some mobility primarily due to the difficulty in maintaining the path of soft-reservations when nodes are mobile.

When the routing path from source to destination changes due to network dynamics, including node mobility, there is an interval of substantial duration in which no QoS reservation exists between the source and the destination. This issue leads to a loss of service, sometimes the extent of which may be greater than in a network without any QoS framework.

SUMMARY OF THE DISCLOSURE

A method and apparatus for routing communications using active and passive end-to-end QoS reservations based on node mobility profiles is disclosed. The method may include setting up active quality of service reservations along a first path to a destination edge node, receiving a mobility profile from the destination edge node, setting up passive quality of service reservations based on the received mobility profile, switching communications from active quality of service reservations to passive quality of service reservations, and tearing down the active quality of service reservations based on the received mobility profile.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
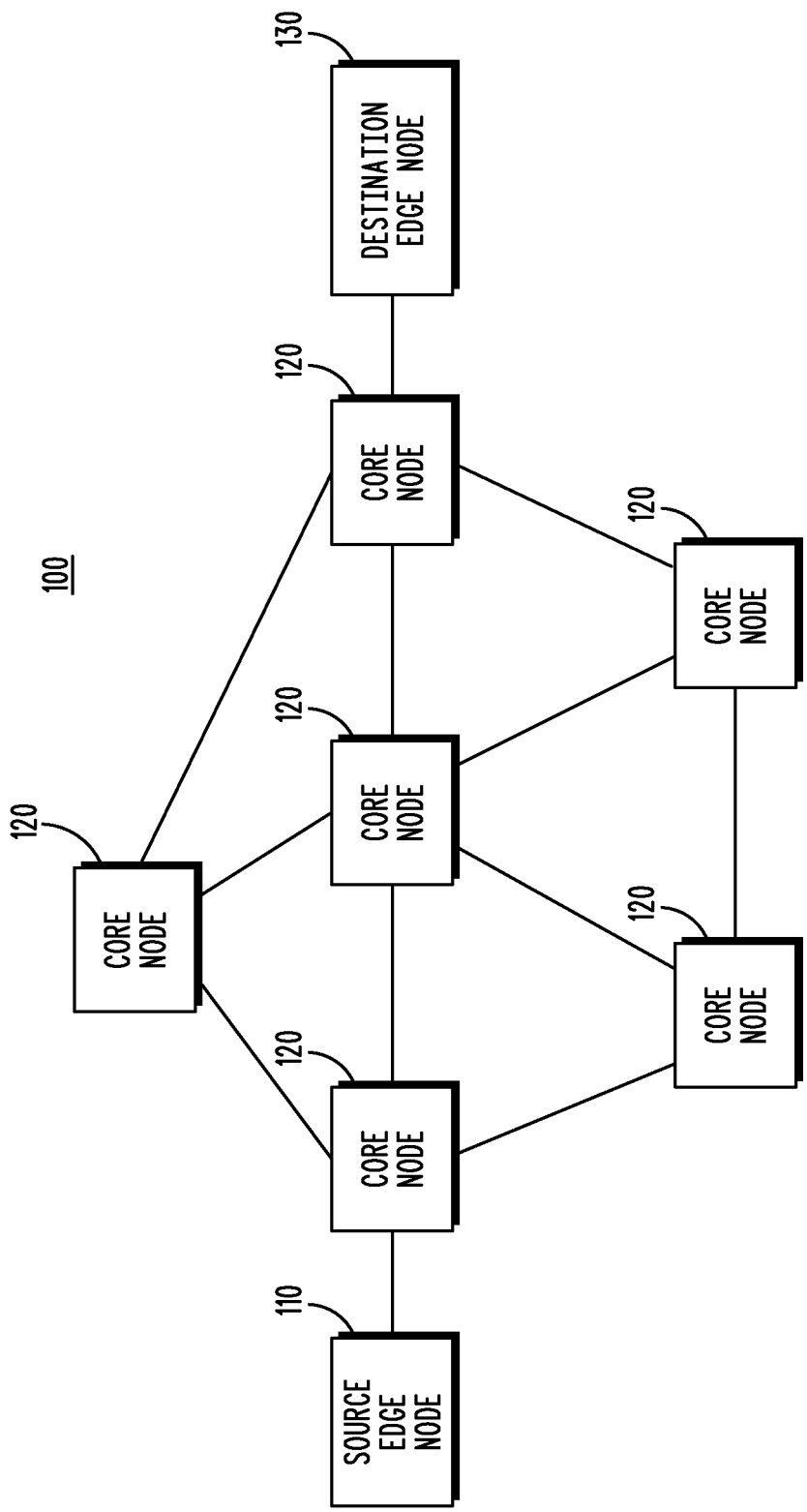
FIG. 1 is an exemplary diagram of a communications network environment in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure may concern a method and apparatus that may reduce the duration in which there is no end-to-end quality of service (QoS) reservation between the source and destination nodes, as network nodes move around. In particular, this disclosure may concern end-to-end QoS reservations using mobility profiles that may use nodes at the edges of the relatively stable core to maintain passive reservations with the source of a communication as proxy to a mobile node that is expected to be connected to those nodes based on its mobility patterns. Due to the maintenance of the passive end-to-end QoS reservations connections (such as in RSVP, for example), as the mobile node moves, the connection teardown and setup to its new location is accomplished in a substantially faster manner.

The disclosed embodiments may concern end-to-end reservations in a particular type of network with mobility, where the mobility patterns are generally known for most nodes requiring end-to-end QoS reservations. The type of network targeted may be a network that may contain a relatively stable core that interconnects clouds of higher mobility sub-networks.

The protocol described in the disclosure may be exercised by a selected set of sources and destinations, as demanded by their QoS requirements. The protocol may be driven by the source and destination nodes and the selected proxy nodes.

The intermediate core nodes may only be required to maintain and process QoS reservations.

Further, for ease of deployment and flexibility of processing, the QoS reservations process may be designed to incorporate the widely practiced diffserv QoS packet marking and processing. The process may establish a reservation between a server and destination by the exchange of messages including a standard RSVP like PATH and RESV messages. The reservations may be based on diffserv traffic classes.

At the time of the initial QoS reservations negotiation, the destination may also send its mobility profile (planned time variant mobility) to the source. The source then initiates the setting up of passive reservations, to appropriate proxy nodes, based on the destination node's mobility profile. The passive reservations may be created in a time staggered manner because the source is in possession of the mobility profile information. With the passive reservations already in place, upon the destination's mobility there is no negotiation required to create a reservation to the destination. This reduces the interval without QoS treatment.

The process described herein may combine (1) the concept of end-to-end reservations such as from RSVP, (2) flexible hop-to-hop prioritization of diffserv, and (3) taking advantage of the known mobility profiles in tactical networks (i.e., networks with a stable core) to formulate an approach suitable for use by selected nodes in a tactical network, particularly in a network with a relatively stable core component. In this manner, this process may allow selected nodes that have mobility plans substantially known beforehand to have the benefit of relatively less interrupted end-to-end QoS reservations.

FIG. 1 illustrates an exemplary diagram of a communications network environment 100 in accordance with a possible embodiment of the disclosure. The communications network environment 100 may include a source edge node 110, plurality of core nodes 120, and a destination edge node 130.

Communications network environment 100 may represent any possible communications network, for example, an Internet Protocol (IP) based network, that may handle voice, data or video communications, including computer networks, wireless telephone networks, hardwired telephone networks, Voice over Internet Protocol (VoIP) networks, wireless local area networks (WLAN), the Internet, an intranet, satellite network, etc., for example.

The source edge node 110, core nodes 120, and destination edge node 130 may represent any communication network device capable of voice, data, or video communications, including a computer, a server, a portable computer, a wireless radio, a wireless telephone, a portable digital video recorder, a cellular telephone, a mobile telephone, a personal digital assistant (PDA), a portable MP3 player, a satellite radio receiver, an AM/FM radio receiver, a satellite television, a portable music player, or combinations of the above, for example. Although only a small number of nodes are shown in FIG. 1, this is merely illustrative. There may be any number of source edge nodes 110, core nodes 120, and destination edge nodes 130 in the communications network environment 100.

Edge nodes 110, 130 and a core node 120 may be co-located. A network may communicate packets of information among the nodes. For example, a source edge node 110, as well as other nodes, can produce packets which are destined for other nodes, such as destination edge nodes 130. The packets of information which are transmitted over the network may carry data, Voice over Internet Protocol (VoIP), streaming audio, video telephone conference data, video information, such as Moving Picture Experts Group (MPEG) video, and other information.

When a packet of data is produced by the source edge node 110, it can carry an address tag identifying the destination node, such as destination edge node 130. A packet leaving the source edge node 110 can traverse a path routed by the core nodes 120. Each successive node may move the packet toward the destination node 130. Each movement of a packet from one core node 120 to the next core node 120 may be termed a "hop".

Figure 2:
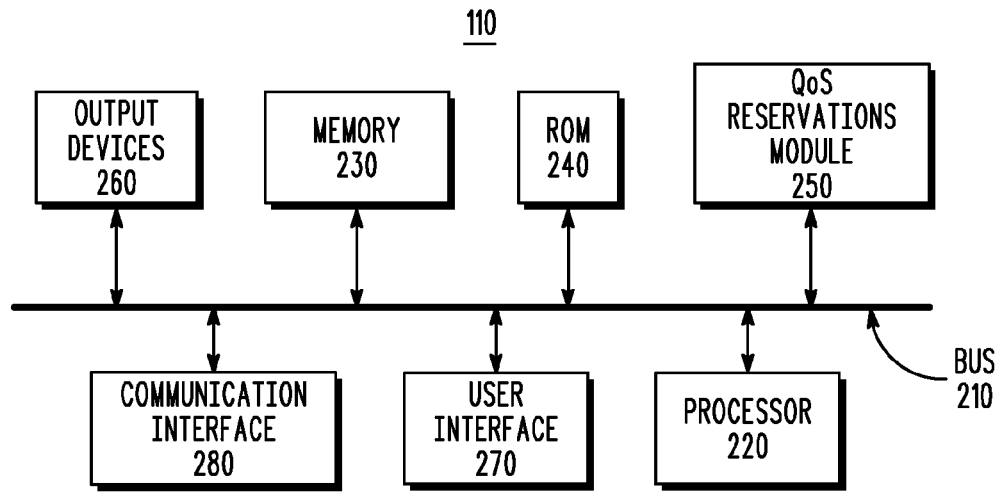
FIG. 2 is a block diagram of an exemplary source edge node in accordance with a possible embodiment of the disclosure.

FIG. 2 is an exemplary block diagram of the source edge node 110 in accordance with a possible embodiment of the disclosure. The source edge node 110 may include a bus 210, a processor 220, a memory 230, ROM 240, a QoS reservations module 250, output devices 260, a user interface 270, and a communication interface 280. Bus 310 may permit communication among the components of the source edge node 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. Memory 230 may also include any type of media, such as, for example, magnetic or optical recording media and its corresponding drive. ROM 240 may include a conventional ROM device or another type of static storage device that stores static information and instructions for processor 220.

User interface 270 may include one or more conventional input mechanisms that permit a user to input information, communicate with the source edge node 110, and/or present information to the user, such as a an electronic display, microphone, touchpad, keypad, keyboard, mouse, pen, stylus, voice recognition device, buttons, one or more speakers, etc. Output devices 260 may include one or more conventional mechanisms that output information to the user, including a printer, one or more speakers, or a medium, such as a memory, or a magnetic or optical disk and a corresponding disk drive.

Communication interface 280 may include any transceiver-like mechanism that enables the source edge node 110 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

The source edge node 110 may perform such functions in response to processor 220 by executing sequences of instructions contained in a computer-readable medium, such as, for example, memory 230, a magnetic disk, or an optical disk. Such instructions may be read into memory 230 from another computer-readable medium, or from a separate device via communication interface 280.

The source edge node 110 illustrated in FIGS. 1 and 2 and the related discussion are intended to provide a brief, general description of a suitable computing environment in which the disclosure may be implemented. Although not required, the disclosed embodiments will be described, at least in part, in the general context of computer-executable instructions, such as program modules, being executed by the cnode 110, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The operations and functions of the QoS reservations module 250 and QoS reservations process will be discussed in relation to the flowchart in FIG. 3. in relation to the diagrams shown in FIGS. 1 and 2, above.

Figure 3:
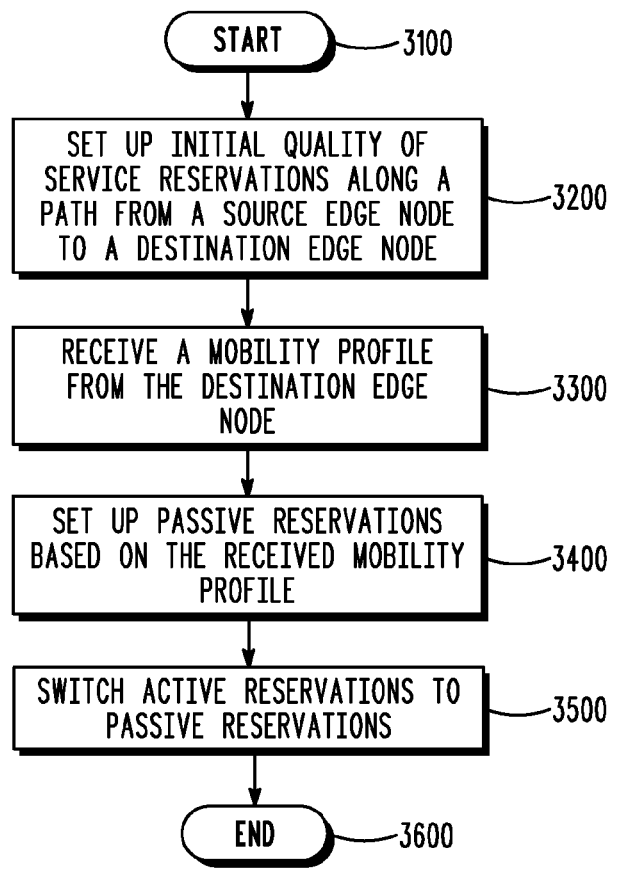
FIG. 3 is an exemplary flowchart illustrating one possible QoS reservations process in accordance with one possible embodiment of the disclosure.

FIG. 3 illustrates is an exemplary flowchart illustrating one possible quality of service process in accordance with one possible embodiment of the disclosure. The process begins at step 3100 and continues to step 3200 where the QoS reservations module 250 may set up initial active quality of service reservations along a path from to the destination edge node 130. In this manner, the QoS reservations module 250 may send a first reservation message to the destination edge node 130 by routing hop-by-hop using one or more core nodes 120 on a first path. The QoS reservations module 250 may set up the active quality of service reservations along the first path according to parameters based on information acquired from messages sent along the first and a second path, where the second path is the reverse of the first path.

At step 3300, the QoS reservations module 250 may receive a mobility profile from the destination edge node 130. The QoS reservations module 250 may receive a second reservation message along with the mobility profile from the destination edge node 130 along a second path.

At step 3400, the QoS reservations module 250 may set up passive quality of service reservations based on the received mobility profile. The QoS reservations module 250 may compute a path for passive reservations considering at least one of the destination edge node travel path, the destination edge node travel speed, the destination edge node travel pattern, and an availability of core nodes to act as proxy nodes. The active quality of service reservations and passive quality of service reservations may be resolved according to a structure on the network that increases the speed of at least one of reservation setup and reservation teardown, for example. Passive reservations may be created in a staggered manner according to timing derived from the mobility profile, for example.

At step 3500, the QoS reservations module 250 may switch communications from active quality of service reservations to passive quality of service reservations. In this manner, the QoS reservations module 250 may issue an activation message to activate selected passive quality of service reservations. The QoS reservations module 250 may determine that the destination edge node cannot receive communications by one of a timer timing out after a message is sent to the destination edge node and a message is received from the destination edge node indicating disconnection from the active QoS reservation path.

The QoS reservations module 250 may also tear down the initial passive quality of service reservations based on received mobility profile. The process may then go to step 3600 and end.

Figure 4:
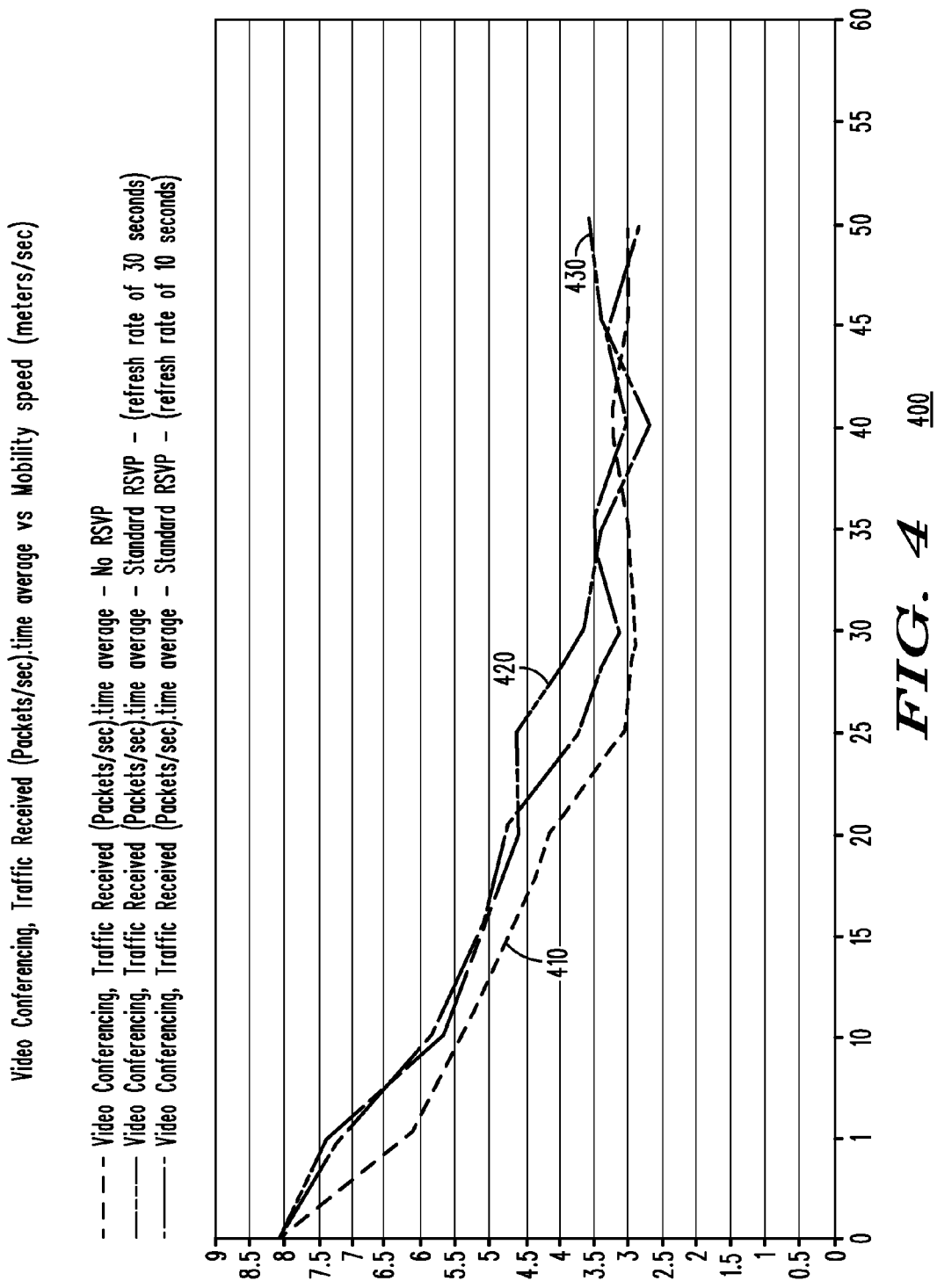
FIG. 4 is an exemplary graph of a RSVP effectiveness in MANET with all nodes having random mobility in accordance with a possible embodiment of the disclosure.

FIG. 4 is an exemplary graph of RSVP effectiveness 400 in a mobile ad hoc network (MANET) with all nodes having random mobility in accordance with a possible embodiment of the disclosure. The graph 400 shows the throughput of three separate flows 410, 420, 430 as network mobility (within a purely random MANET of 44 nodes) increases. The two graphs that are higher performing 420, 430 especially at the lower mobility rates show that manipulation of the RSVP path refresh interval may yield better performance (indicated here by throughput) in mobile environments. The graph 420 indicates are fresh interval of 30 seconds and the graph 430 indicates a refresh interval of 10 seconds. The graph 410 shows the throughput of a flow without RSVP.

The point after which the red graph 410 is not consistently worse than a RSVP graph may approximate the level of network mobility beyond which RSVP is unlikely to yield significant benefits. In this purely random environment, RSVP flows yield substantial gains over flows without reservations, up to a mobility rates average about 82 milliseconds per hop (mph) with RSVP refresh interval 30 seconds and up to about 89 mph with refresh interval set at 10 seconds.

Figure 5:
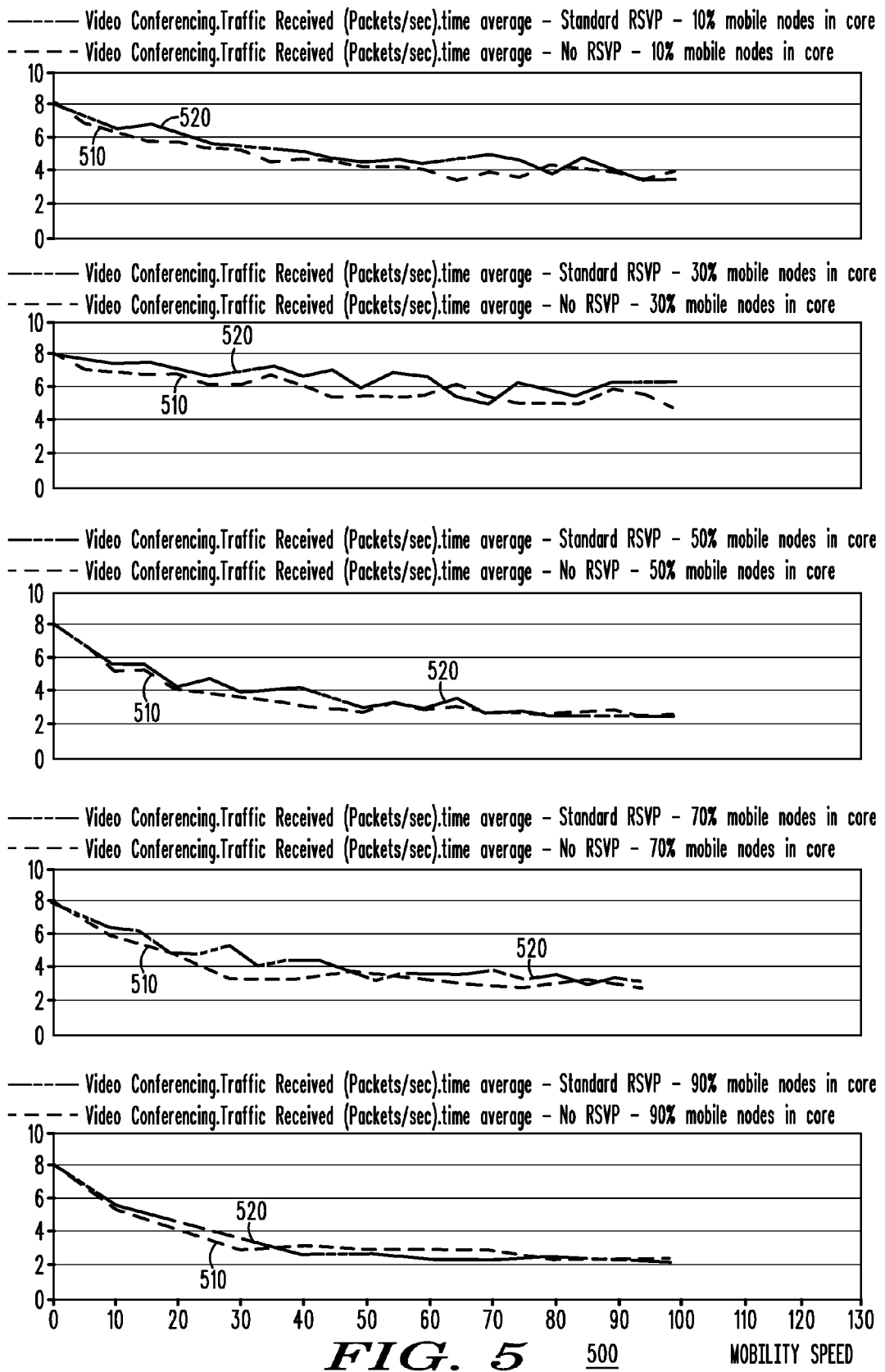
FIG. 5 is an exemplary graph of RSVP effectiveness with varying degrees of mobility in accordance with a possible embodiment of the disclosure.

FIG. 5 is an exemplary graph 500 of RSVP effectiveness with varying degrees of mobility in accordance with a possible embodiment of the disclosure. In particular, graph 500 shows the performance of RSVP in networks with controlled rates of mobility. The trend is clearly shown that with increasing mobility in the network the point at which RSVP does not consistently yield gains over and above flows without RSVP moves to the left. The line 510 indicates the flow without reservation while the line 520 indicates RSVP flow with the 30 seconds refresh interval. Note that at 10% of the nodes being mobile, RSVP is shown consistently better performing up to a mobility rate of 178 mph.

Figure 6:
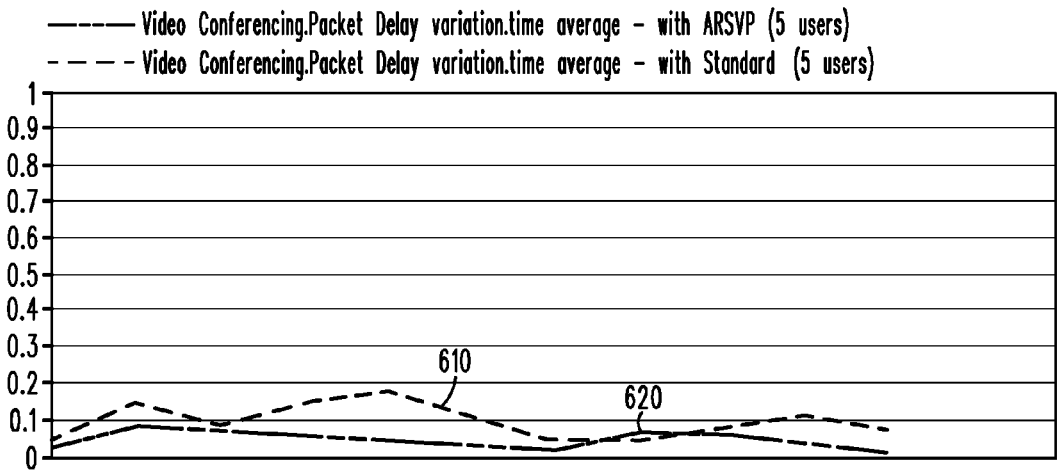
FIG. 6 is an exemplary graph of jitter in with mobility in accordance with a possible embodiment of the disclosure.
Figure 6:
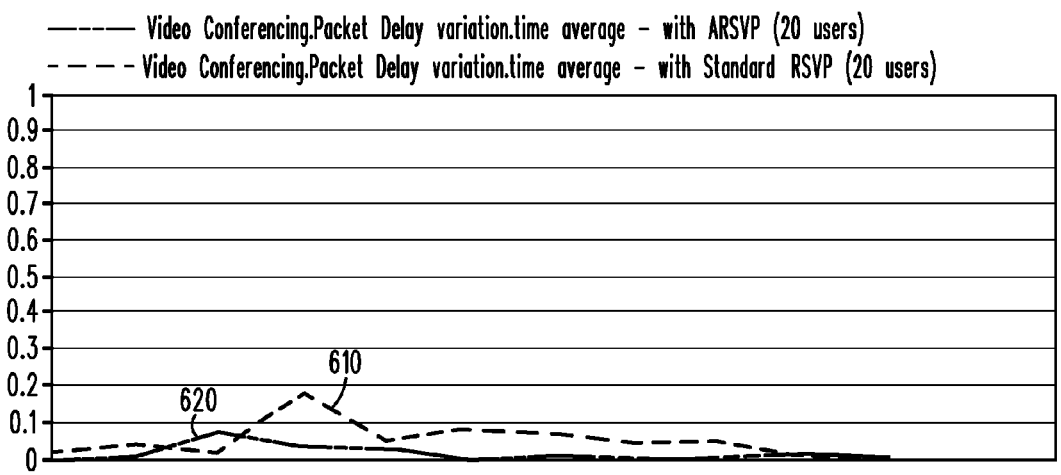
Figure 6:
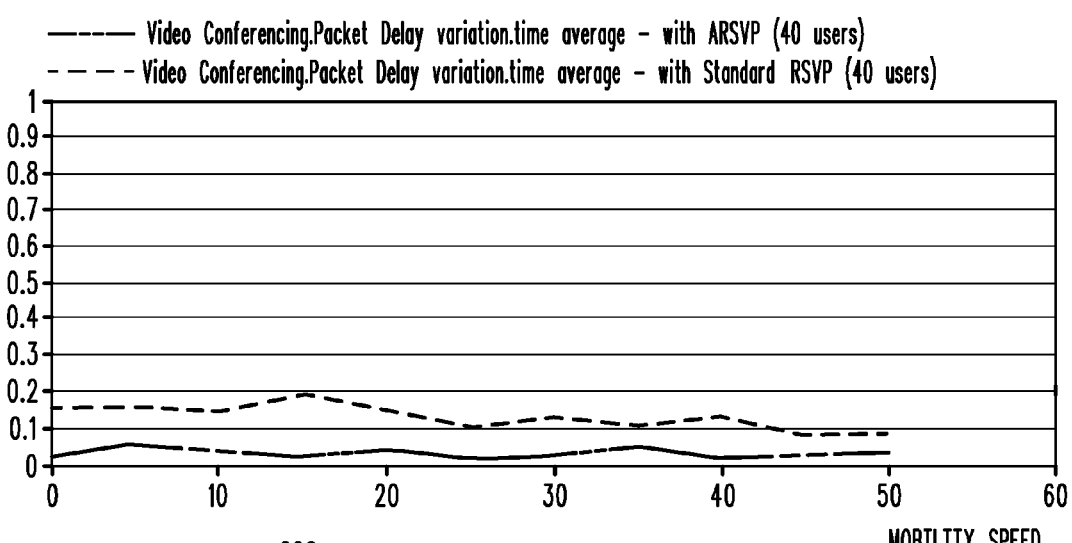

FIG. 6 is an exemplary graph 600 of jitter with mobility in accordance with a possible embodiment of the disclosure. In particular, graph 600 shows that in general the process using end-to-end QoS reservations based on node mobility profiles has a lower packet delay variation (jitter) than RSVP. As the number of simultaneous flows using reservations increase, so does the jitter. The graph for 40 simultaneous flows shows that regardless of the average mobility rate, the jitter in RSVP was more than double that with the end-to-end QoS reservations process described herein.

Figure 7:
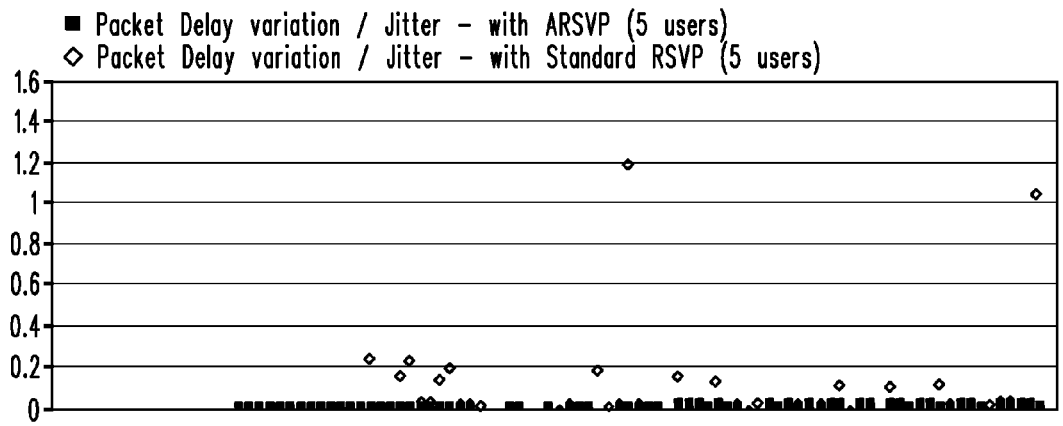
FIG. 7 is an exemplary graph of packet delay with varying number of flows in accordance with a possible embodiment of the disclosure.
Figure 7:
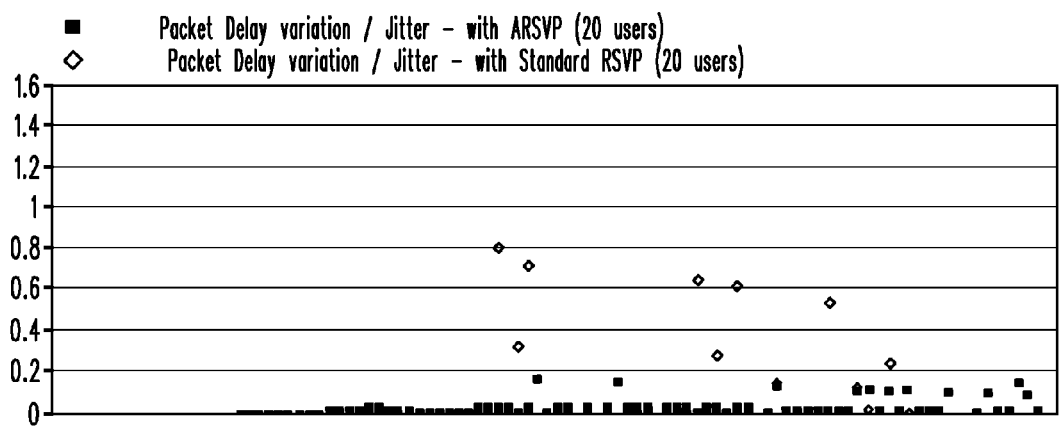
Figure 7:
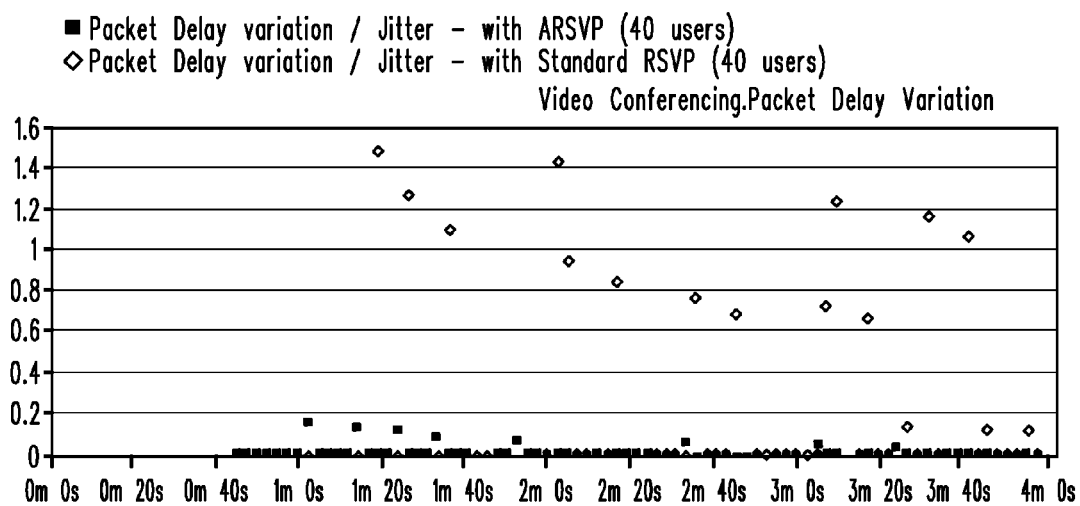

FIG. 7 is an exemplary graph 700 of packet delay with varying number of flows in accordance with a possible embodiment of the disclosure. In particular, graph 700 shows a clearer illustration of the difference in packet delay between RSVP and the end-to-end QoS reservations process based on node mobility profiles. The graphs show jitter as a function of time, for varying number of users. As the number of simultaneous flows (in these simulations all the simultaneous flows request the same class of service) the magnitude of the difference grows substantially.

Figure 8:
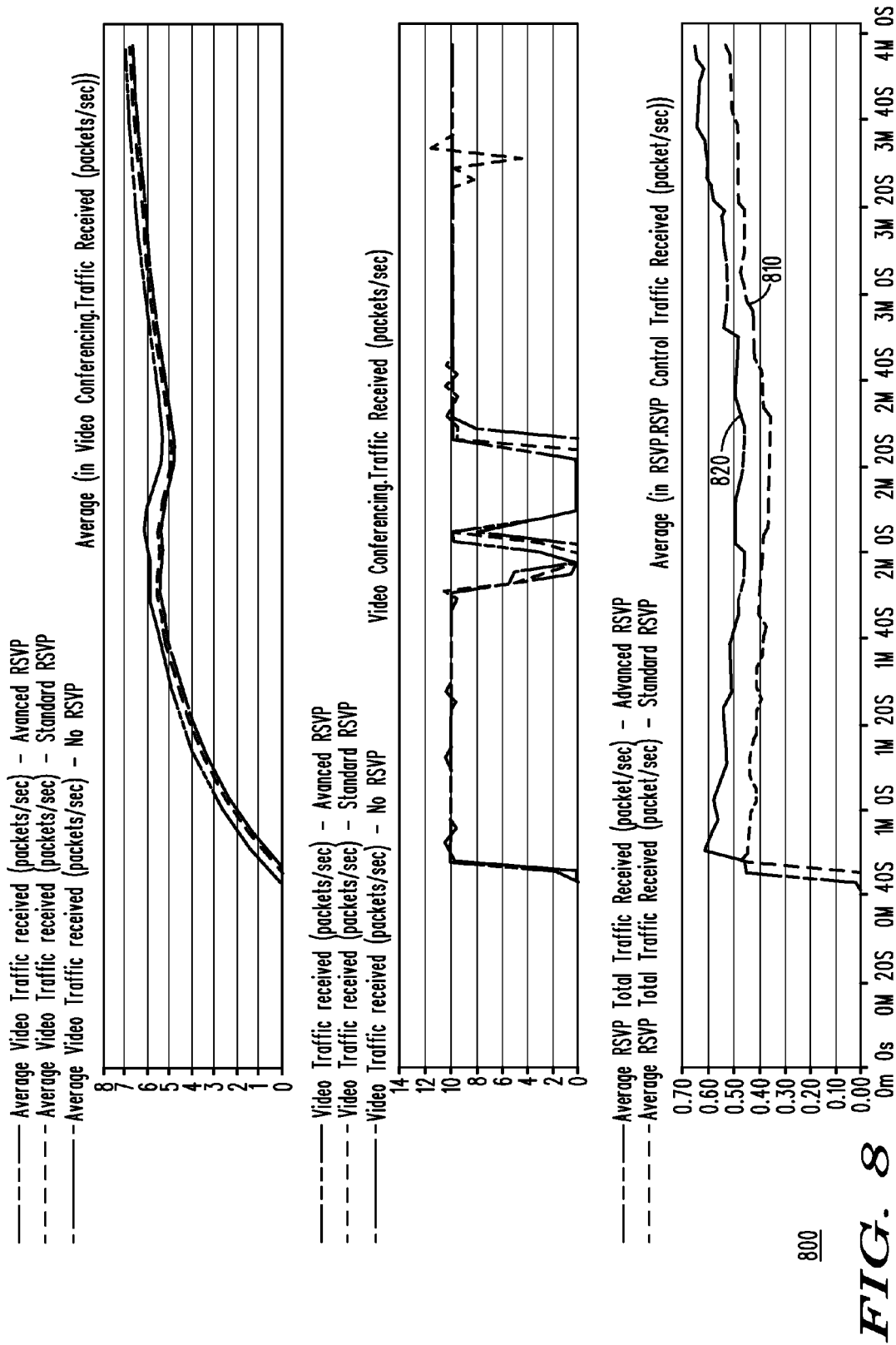
FIG. 8 is an exemplary graph of end-to-end traffic flow and recovery time of in accordance with a possible embodiment of the disclosure.
Figure 9:
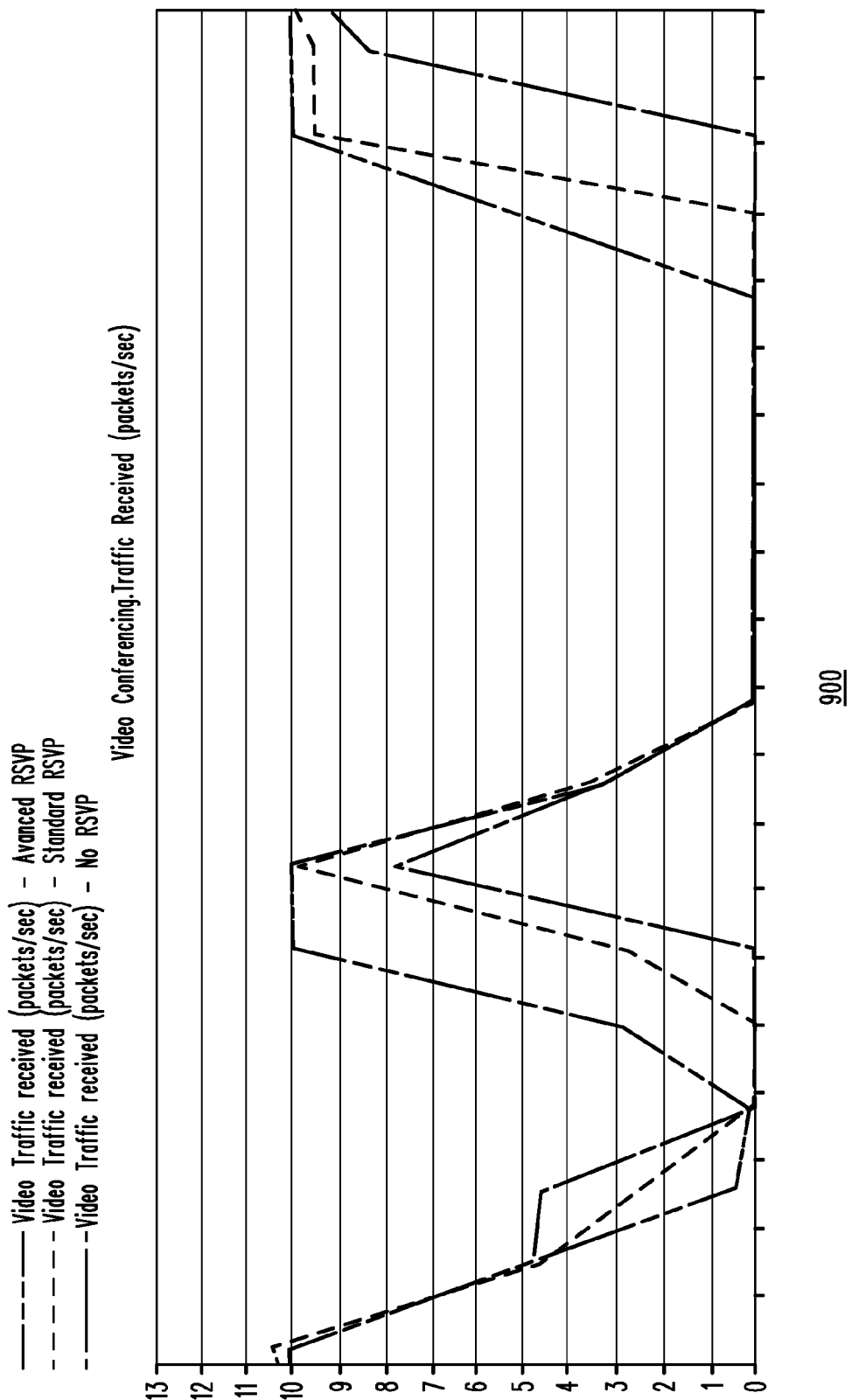
FIG. 9 is an exemplary graph of the reduction in recovery time in accordance with a possible embodiment of the disclosure.

FIG. 8 is an exemplary graph 800 of end-to-end traffic flow and recovery time of in accordance with a possible embodiment of the disclosure. In particular, graph 800 shows that in general the average traffic received by end-to-end QoS reservations process flow endpoint is higher than that for RSVP or no-RSVP in this mobile environment. This result can be generally attributed to having effective reservations that ensure priority for the end-to-end QoS reservations process flow at least up to some point in the path from source to the receiver. The second graph, in its troughs, clearly shows where and for how long the routing reachability to the receiver was lost and how each protocol responded in recovering. FIG. 9 is an exemplary graph 900 showing a clearer view of the reduction in recovery time in accordance with a possible embodiment of the disclosure.

The third graph in FIG. 8 shows the difference in overhead incurred in terms of control messages in graph 820 and RSVP graph 810. The overhead control messages consist mainly of REFRESH messages, and the end-to-end QoS reservations process incurs an average of approximately 15% increase over RSVP. However, as the second graph shows the end-to-end QoS reservations based on node mobility profiles, due to the fact that passive reservations to the new location are maintained, consistently recovers substantially faster than RSVP.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components in the disclosed embodiments each processing the content in various possible ways. It does not necessarily need to be one system used by all end users. Accordingly, the appended claims and their legal equivalents should only define the disclosure, rather than any specific examples given.

We claim:

1. A method for transmitting communications from a source edge node to a destination edge node in a communication network using end-to-end quality of service reservations based on node mobility profiles, comprising:

setting up active quality of service reservations along a first path from the source edge node to the destination edge node;

receiving by the source edge node a mobility profile from the destination edge node;

setting up passive quality of service reservations by the source edge node based on the received mobility profile, wherein a computed path for passive quality of service reservations is a function of at least one of destination edge node travel path, destination edge node travel speed, destination edge node travel pattern, and availability of core nodes to act as proxy nodes; and switching communications by the source node from the active quality of service reservations to the passive quality of service reservations based on node mobility according to the received mobility profile.

2. The method of claim 1, further comprising:

tearing down the passive quality of service reservations by the source edge node based on the received mobility profile.

3. The method of claim 1, further comprising:

sending a first reservation message from the source edge node to the destination edge node by routing hop-by-hop using core nodes on the first path between the source edge node and the destination edge node; and receiving by the source edge node a second reservation message along with the mobility profile from the destination edge node along a second path, the second path being a reverse of the first path between the source edge node and the destination edge node.

4. The method of claim 3, wherein the active quality of service reservations are set up along the first path according to parameters based on information acquired from the first reservation message and the second reservation message sent along the first path and the second path.

5. The method of claim 1, wherein the communication network is a mobile ad hoc network (MANET) with all nodes having random mobility.

6. The method of claim 5, wherein the active quality of service reservations and the passive quality of service reservations are resolved according to a structure on the communication network that increases a speed of at least one of reservation setup and activation along a new path.

7. The method of claim 1, wherein the passive quality of service reservations are created in a staggered manner according to timing derived from the received mobility profile.

8. The method of claim 1, further comprising:

determining that the destination edge node cannot receive communications by one of a timer of the source edge node timing out after a message is sent from the source edge node to the destination edge node and a message being received by the source edge node from the destination edge node indicating disconnection from an active quality of service reservation path.

9. The method of claim 1, further comprising:

issuing an activation message by the source edge node to activate selected ones of the passive quality of service reservations.

10. The method of claim 1, wherein the communications are sent from the source edge node, and the source edge node is one of a computer, a server, a portable computer, a wireless radio, a wireless telephone, a portable digital video recorder, a cellular telephone, a mobile telephone, a personal digital assistant, a portable MP3 player, a satellite radio receiver, an AM/FM radio receiver, a satellite television, a portable music player, and combinations of the above.

11. A source edge node that routes communications in a communication network using end-to-end quality of service reservations based on node mobility profiles, comprising:
- a communication interface that facilitates communications to other nodes in the communication network;
- a processor, in communication with a memory, for executing instructions to: set up active quality of service reservations along a first path from the source edge node to a destination edge node; receive a mobility profile from the destination edge node; set up passive quality of service reservations based on the received mobility profile, wherein a computed path for passive quality of service reservations is a function of at least one of destination edge node travel path, destination edge node travel speed, destination edge node travel pattern, and availability of core nodes to act as proxy nodes; and switch communications from the active quality of service reservations to the passive quality of service reservations based on node mobility according to the received mobility profile.

12. The source edge node of claim 11, wherein the QoS reservations module tears down the passive quality of service reservations based on the received mobility profile.

13. The source edge node of claim 11, wherein the QoS reservations module sends a first reservation message from the source edge node to the destination edge node by routing hop-by-hop using core nodes on the first path, and receives a second reservation message along with the mobility profile from the destination edge node along a second path, the second path being a reverse of the first path between the source edge node and the destination edge node.

14. The source edge node of claim 13, wherein the QoS reservations module sets up the active quality of service reservations along the first path according to parameters based on information acquired from the first reservation message and the second reservation message sent along the first path and the second path.

15. The source edge node of claim 11, wherein the QoS reservations module computes a path for the passive quality of service reservations considering at least one of a destination edge node travel path, a destination edge node travel speed, a destination edge node travel pattern, and an availability of core nodes to act as proxy nodes.

16. The source edge node of claim 15, wherein the active quality of service reservations and the passive quality of service reservations are resolved according to a structure on the communication network that increases a speed of at least one of reservation setup and activation along a new path.

17. The source edge node of claim 11, wherein the passive quality of service reservations are created in a staggered manner according to timing derived from the received mobility profile.

18. The source edge node of claim 11, wherein the QoS reservations module determines that the destination edge node cannot receive communications by one of a timer timing out after a message is sent from the source edge node to the destination edge node and a message being received from the destination edge node indicating disconnection-from an active quality of service reservation path.

19. The source edge node of claim 11, wherein the QoS reservations module issues an activation message to activate selected ones of the passive quality of service reservations.

20. The source edge node of claim 11, wherein the source edge node is one of a computer, a server, a portable computer, a wireless radio, a wireless telephone, a portable digital video recorder, a cellular telephone, a mobile telephone, a personal digital assistant, a portable MP3 player, a satellite radio receiver, an AM/FM radio receiver, a satellite television, a portable music player, and combinations of the above.

21. A non-transitory computer readable medium that stores instructions for controlling a computing device to execute a method for routing communications in a communication network using end-to-end quality of service reservations based on node mobility profiles, the method comprising:
- setting up active quality of service reservations along a first path from a source edge node to a destination edge node;
- receiving by the source edge node a mobility profile from the destination edge node;
- setting up passive quality of service reservations by the source edge node based on the received mobility profile, wherein a computed path for passive quality of service reservations is a function of at least one of destination edge node travel path, destination edge node travel speed, destination edge node travel pattern, and availability of core nodes to act as proxy nodes;
- switching communications by the source edge node from the active quality of service reservations to the passive quality of service reservations based on node mobility according to the received mobility profile;
- wherein the communication network is a mobile ad hoc network (MANET) with all nodes having random mobility.

22. The non-transitory computer readable medium of claim 21, the method further comprising:
- tearing down the passive quality of service reservations by the source edge node based on the received mobility profile.

23. The non-transitory computer readable medium of claim 21, the method further comprising:
- sending a first reservation message from the source edge node to the destination edge node by routing hop-by-hop using core nodes on the first path between the source edge node and the destination edge node; and
- receiving by the source edge node a second reservation message along with the mobility profile from the destination edge node along a second path, the second path being a reverse of the first path between the source edge node and the destination edge node.

24. The non-transitory computer readable medium of claim 23, wherein the active quality of service reservations are set up along the first path according to parameters based on information acquired from the first reservation message and the second reservation message sent along the first path and the second path.

25. The non-transitory computer readable medium of claim 21, the method further comprising:
- computing a path for the passive quality of service reservations considering at least one of a destination edge node travel path, a destination edge node travel speed, a destination edge node travel pattern, and an availability of core nodes to act as proxy nodes.

26. The non-transitory computer readable medium of claim 25, wherein the active quality of service reservations and the passive quality of service reservations are resolved according to a structure on the communication network that increases a speed of at least one of reservation setup and activation along a new path.

27. The non-transitory computer readable medium of claim 21, wherein the passive quality of service reservations are created in a staggered manner according to timing derived from the received mobility profile.

28. The non-transitory computer readable medium of claim 21, the method further comprising:

determining that the destination edge node cannot receive communications by one of a timer of the source edge node timing out after a message is sent from the source edge node to the destination edge node and a message being received by the source edge node from the destination edge node indicating disconnection from an active quality of service reservation path.

29. The non-transitory computer readable medium of claim 21, the method further comprising:
issuing an activation message by the source edge node to activate selected ones of the passive quality of service reservations.

30. The non-transitory computer readable medium of claim 21, wherein the communications are sent from the source edge node, and the source edge node is one of a computer, a server, a portable computer, a wireless radio, a wireless telephone, a portable digital video recorder, a cellular telephone, a mobile telephone, a personal digital assistant, a portable MP3 player, a satellite radio receiver, an AM/FM radio receiver, a satellite television, a portable music player, and combinations of the above.

* * * * *